United States Patent
Schwarz et al.

(10) Patent No.: US 10,876,064 B2
(45) Date of Patent: Dec. 29, 2020

(54) LUBRICATING OIL ADDITIVES

(71) Applicant: Infineum International Limited, Abingdon (GB)

(72) Inventors: Andrew D. Schwarz, Abingdon (GB); Manuel Hartweg, Cambridge, MA (US); Beatrice Cattoz, Bristol (GB); Daniel J. Phillips, Southam (GB); Anthony J. Strong, Oxford (GB); Remzi Becer, Rugby (GB)

(73) Assignee: Infineum International Limited (GB)

( * ) Notice: Subject to any disclaimer, the term of this patent is extended or adjusted under 35 U.S.C. 154(b) by 0 days.

(21) Appl. No.: 16/201,045

(22) Filed: Nov. 27, 2018

(65) Prior Publication Data
US 2019/0161698 A1    May 30, 2019

(30) Foreign Application Priority Data
Nov. 29, 2017  (EP) .................................... 17204466

(51) Int. Cl.
| | |
|---|---|
| *C10M 149/12* | (2006.01) |
| *C08G 73/02* | (2006.01) |
| *C10M 169/04* | (2006.01) |
| *C10N 20/04* | (2006.01) |
| *C10N 20/00* | (2006.01) |
| *C10N 30/02* | (2006.01) |
| *C10N 30/06* | (2006.01) |
| *C10N 40/10* | (2006.01) |
| *C10N 40/25* | (2006.01) |
| *C10N 70/00* | (2006.01) |

(52) U.S. Cl.
CPC ....... *C10M 149/12* (2013.01); *C08G 73/0233* (2013.01); *C10M 169/041* (2013.01); *C10M 2203/003* (2013.01); *C10M 2217/04* (2013.01); *C10M 2217/044* (2013.01); *C10M 2217/046* (2013.01); *C10N 2020/04* (2013.01); *C10N 2020/065* (2020.05); *C10N 2020/067* (2020.05); *C10N 2020/069* (2020.05); *C10N 2020/071* (2020.05); *C10N 2020/073* (2020.05); *C10N 2030/02* (2013.01); *C10N 2030/06* (2013.01); *C10N 2040/10* (2013.01); *C10N 2040/25* (2013.01); *C10N 2070/00* (2013.01)

(58) Field of Classification Search
CPC .......................... C08G 73/0233; C10M 149/12
USPC .................................................. 508/554, 555
See application file for complete search history.

(56) References Cited

U.S. PATENT DOCUMENTS

| | | | |
|---|---|---|---|
| 3,483,141 A | 12/1969 | Litt et al. | |
| 4,120,804 A * | 10/1978 | Smith | .................... C10L 1/2383 508/548 |
| 4,408,001 A * | 10/1983 | Ginter | ...................... C08K 5/05 424/78.17 |
| 4,659,777 A * | 4/1987 | Riffle | .................. C08G 73/0233 525/100 |
| 4,702,854 A | 10/1987 | Snyder, Jr. et al. | |
| 5,786,308 A * | 7/1998 | Eicken | .................... C09D 5/037 525/410 |
| 10,407,639 B2 * | 9/2019 | Schwarz | ................ C08G 69/00 |

FOREIGN PATENT DOCUMENTS

EP          3257921 A1    12/2017

OTHER PUBLICATIONS

M. Beck et al., Polyoxazoline aug fettchemischer Basis. 2373 Angewandte Makromoleedulare Chemie, Applied Macromolecular Chemistry and Physics, 223(1994)December, Zug, CH, pp. 217-233 (4018), 1994 Huthig & Wepf Verlag, Zug.

\* cited by examiner

*Primary Examiner* — Ellen M McAvoy

(57) ABSTRACT

A lubricating composition comprises a major amount of an oil of lubricating viscosity and 0.01 to 25 percent by mass, based on the mass of the composition of an oil-soluble copolymer. The copolymer comprises units (a) and units (b):

—N(COR$^1$)CH$_2$CH$_2$—           (a)

—N(COR$^2$)CH$_2$CH$_2$CH$_2$—        (b)

wherein the polymer carries an inorganic or organic nucleophilic polymerisation terminating group (t), and an initiator group (i) connected to the N atom of a repeat unit (a) or (b), the initiator group (i) being effective to initiate the polymerisation of linear, branched or cyclic hydrocarbyl moieties. R$^1$ and R$^2$ are the same or different and comprise a single or a mixture of linear, branched or cyclic hydrocarbyl groups having 1-50 carbon atoms, some or all having 12-50 carbon atoms, or of at least one macro-monomeric hydrocarbyl group with more than 50 carbon atoms.

18 Claims, No Drawings

LUBRICATING OIL ADDITIVES

FIELD OF THE INVENTION

This invention relates to polymeric additives for use in lubricating oil compositions (lubricants) for lubricating the crankcase of spark-ignited or compression-ignited internal combustion engines. More especially, the additives are copolymers of oxazoline monomers and oxazine monomers that provide friction modifying properties to lubricating oils. The additives also do not adversely affect lubricant viscosity.

BACKGROUND OF THE INVENTION

There is much interest in improving the fuel economy of gasoline and diesel engines. This can be done, through the lubricant engine oil, by reducing the friction contribution either of the bulk fluid (by lowering the oil viscosity) or improving the friction of the contacting parts by inclusion of friction modifier additives.

There is therefore interest in additives with low friction properties in low viscosity oils.

Dispersant viscosity modifier (DVM) additives are known to provide friction modification. Examples known in the art, based on polymer technology, are olefin copolymers (OCP) and methacrylate copolymers. A problem with such additives especially in applications which require ultra-low viscosity lubricating fluids such as 0W-8, 0W-16, 0W-20 is their high thickening efficiencies.

Poly(2-oxazoline)s are known in the art. For example, the art describes the living cationic ring-opening polymerization of 2-oxazolines. See Hoogenboom et al., Angew. Chem. Int. Ed 2009, 48, 7978-7994. U.S. Pat. No. 4,120,804 describes the use of short oligomers of poly(2-oxazoline)s having 2 to 15 repeating units as dispersants to prevent or reduce the formation of sludges, or to neutralise acidic components etc. in lubricating oils. The polymerisation initiator is a polymeric material of molecular weight equal to or greater than 250 and the oxazoline is 2-substituted with a hydrocarbyl group of 1-18 carbon atoms. No mention is made of friction modification, or of lubricant viscosity impact.

Polyoxazines are also known in the art see Hoogenboom et al., Macromol., 2011, 3420. U.S. Pat. No. 4,001,147 describes certain polyoxazines as useful to remove phenolic compounds from aqueous waste streams.

U.S. Pat. No. 5,439,978 describes the use of both oxazoline and oxazine-based copolymers as additives to render electrically conductive, nonconductive materials such as plastics.

SUMMARY OF THE INVENTION

In a first aspect, the invention provides a lubricating composition comprising a major amount of an oil of lubricating viscosity and 0.01 to 25 percent by mass, based on the mass of the composition of an oil-soluble copolymer comprising units (a) and units (b):

wherein the polymer carries an inorganic or organic nucleophilic polymerisation terminating group (t), and an initiator group (i) connected to the N atom of a repeat unit (a) or (b), the initiator group (i) being effective to initiate the polymerisation of linear, branched or cyclic hydrocarbyl moieties; and wherein $R^1$ and $R^2$ are the same or different and comprise a single or a mixture of linear, branched or cyclic hydrocarbyl groups having 1-50 carbon atoms, some or all having 12-50 carbon atoms, or of at least one macro-monomeric hydrocarbyl group with more than 50 carbon atoms.

In a second aspect, the invention provides a method of lubricating the crankcase of an internal combustion engine comprising operating the engine and lubricating the crankcase with a lubricating composition of the first aspect of the invention in the form of a crankcase lubricant.

In a third aspect, the invention provides the use of an oil-soluble copolymer comprising units (a) and units (b):

wherein the polymer carries an inorganic or organic nucleophilic polymerisation terminating group (t), and an initiator group (i) connected to the N atom of a repeat unit (a) or (b), the initiator group (i) being effective to initiate the polymerisation of linear, branched or cyclic hydrocarbyl moieties; and wherein $R^1$ and $R^2$ are the same or different and comprise a single or a mixture of linear, branched or cyclic hydrocarbyl groups having 1-50 carbon atoms, some or all having 12-50 carbon atoms, or of at least one macro-monomeric hydrocarbyl group with more than 50 carbon atoms, in a lubricant for an internal combustion engine to provide the lubricant, in operation of the engine, with friction reducing properties.

Units (a) of the copolymer are derived from 2-substituted-2-oxazoline monomers and units (b) are derived from 2-substituted-2-oxazine monomers. The copolymers of the invention may be made by living cationic ring-opening polymerization of the two types of monomer.

Preferably units (a) comprise from 1 to 99 mol % of the copolymer and units (b) comprise from 1 to 99 mol % of the copolymer. More preferably, units (a) comprise from 10 to 90 mol % of the copolymer and units (b) comprise from 10 to 90 mol % of the copolymer. For example, the copolymer may comprise from 20 to 80 mol % or 30 to 70 mol % or 40 to 60 mol % of units (a) and from 20 to 80 mol % or 30 to 70 mol % or 40 to 60 mol % of units (b). In a preferred embodiment the copolymer comprises 50 mol % of units (a) and 50 mol % of units (b).

In some embodiments, the copolymer is a statistical copolymer or a random copolymer. In other embodiments, the copolymer is an alternating copolymer, a periodic copolymer or a block copolymer.

The copolymer may have linear architecture or may have a branched or star architecture.

A general process for making statistical or random copolymers comprises polymerizing a mixture of at least one 2-substituted-2-oxazoline and at least one at least one 2-substituted-2-oxazine with an initiator.

A general process for making block copolymers comprises polymerising a first 2-substituted-2-oxazine monomer with an initiator to make a first polymeric block and then polymerising with a 2-substituted-2-oxazoline monomer to make a second polymeric block. Further blocks may be provided if required.

Examples of these processes will be provided in this specification.

DETAILED DESCRIPTION OF THE INVENTION

Definitions

In this specification, the following words and expressions, if and when used, have the meaning given below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof. The expressions "consists of" or "consists essentially of" or cognates may be embraced within "comprises" or any cognate word. The expression "consists essentially of" permits inclusion of substances not materially affecting the characteristics of the composition to which it applies. The expression "consists of" or cognates means only the stated features, steps, integers components or groups thereof are present to which the expression refers;

"hydrocarbyl" means a chemical group of a compound that contains hydrogen and carbon atoms and that is bonded to the remainder of the compound directly via a carbon atom. The group may contain one or more atoms other than carbon and hydrogen ("hetero atoms") provided they do not affect the essentially hydrocarbyl nature of the group. Those skilled in the art will be aware of suitable groups (e.g., halo, especially chloro and fluoro, amino, alkoxyl, mercapto, alkylmercapto, nitro, nitroso, sulfoxy, etc.). The group may be unsaturated, and/or may be polymeric. Preferably, the hydrocarbyl group consists essentially of hydrogen and carbon atoms. More preferably, the hydrocarbyl group consists of hydrogen and carbon atoms and so is a hydrocarbon group. Preferably, the hydrocarbyl group is an aliphatic hydrocarbyl group, such as an alkyl group;

"oil-soluble" or "oil-dispersible", or cognate terms, used herein do not necessarily indicate that the compounds or additives are soluble, dissolvable, miscible, or are capable of being suspended in the oil in all proportions. These do mean, however, that they are, for example, soluble or stably dispersible in oil to an extent sufficient to exert their intended effect in the environment in which the oil is employed. Moreover, the additional incorporation of other additives may also permit incorporation of higher levels of a particular additive, if desired;

"ashless" in relation to an additive means the additive does not include a metal;

"ash-containing" in relation to an additive means the additive includes a metal;

"major amount" means in excess of 50 mass % of a composition or mixture;

"minor amount" means 50 mass % or less of a composition or mixture;

"effective amount" in respect of an additive means an amount of such an additive in the composition (e.g. an additive concentrate) that is effective to provide, and provides, the desired technical effect;

"ppm" means parts per million by mass, based on the total mass of the composition;

"metal content" of a composition or of an additive component, for example molybdenum content or total metal content of the additive concentrate (i.e. the sum of all individual metal contents), is measured by ASTM D5185;

"TBN" in relation to an additive component or of a composition, means total base number (mg KOH/g) as measured by ASTM D2896;

"$KV_{100}$" means kinematic viscosity at 100° C. as measured by ASTM D445;

HTHS means High Temperature High Shear at 150° C. as measured by-CEC-L-36-A-90.

"phosphorus content" is measured by ASTM D5185;

"sulfur content" is measured by ASTM D2622;

"sulfated ash content" is measured by ASTM D874;

$M_n$ means number average molecular weight as measured by Gel Permeation Chromatography with reference to linear narrow poly(methylmethacrylate) standards in the range of 550 to 600,000 g/mol;

$M_w$ means weight average molecular weight as measured by Gel Permeation Chromatography with reference to linear narrow poly(methylmethacrylate) standards in the range of 550 to 600,000 g/mol;

"dispersity" means $M_w/M_n$, (denoted by Ð)

Also it will be understood that various components used, essential as well as optimal and customary, may react under condition of formulation, storage and use and that the invention also provides the product(s) obtainable or obtained by any such reaction.

Further it is understood that any upper and lower quality, range or ratio limits set forth herein may be independently combined.

Copolymers

The copolymers useful in the invention are copolymers, i.e. polymers derived from more than one species of monomer. They are formed from at least one 2-substituted-2-oxazoline monomer and at least one at least one 2-substituted-2-oxazine monomer.

As examples of copolymers there may be mentioned statistical copolymers which are formed where the polymerisation follows a known statistical rule, for example Bernouillian statistics or Markovian statistics. A statistical polymer where the probability of finding a particular type of monomer residue at any particular point in the polymer chain is independent of the types of surrounding monomers can be referred to as a random copolymer. Statistical and random copolymers may be distinguished from more ordered polymer types such as alternating copolymers, periodic copolymers and block copolymers.

Block copolymers, i.e. in which two or more polymer (e.g. homopolymers) sub-units are linked by covalent bonds (e.g. as di- or tri-blocks), are noteworthy in the context of this invention. The blocks in any block copolymer may be of equal size or of different sizes and the architecture of the copolymers can vary. For example, block copolymers may have only a single block of each monomer (i.e. in a 'AB' arrangement) or multiple blocks of each monomer (i.e. in an 'ABABAB . . . ' arrangement) where blocks 'A' and 'B' may be the same size or of different sizes.

Also noteworthy are branched polymers, in particular star polymers where several (three or more) linear polymer chains (or "arms") are covalently bonded to a central core.

Any cationic specks is capable of initiating polymerization of 2-oxazolines or 2-oxazines. Examples include $H^+$ (from HCl or other acids); $R^+$ (for example from alkyl halides such as RI or RBr); and metal cations and salts (e.g. $Zr^{4+}$). Any nucleophilic species is capable of terminating the polymerization (e.g. $OH^-$ from atmospheric water, $OTs^-$ (tosylate), $H_2NR$, HSR). Other suitable initiator groups (i) and terminating groups (t) will be known to those skilled in the art.

When a star architecture is required, the copolymer may be prepared by use of a multifunctional initiator; by cross linking; or by use of a multifunctional terminator or coupling.

Preferably, the copolymer has a number average molecular weight (Mn) of 2,000-500,000 g/mol. More preferably, the copolymer has a number average molecular weight (Mn) of 4,000-100,000 g/mol. Even more preferably, the copolymer has a number average molecular weight (Ma) of 6,000-50,000 g/mol, for example 8,000-20,000 g/mol. All molecular weights are as measured by Gel Permeation Chromatography with reference to linear narrow poly(methylmethacrylate) standards in the range of 550 to 600,000 g/mol.

In an embodiment, the copolymer has a star architecture with three or more arms, and a number average molecular weight (Mn) of 10,000-500,000 g/mol, $R^1$ and/or $R^2$ having at least some groups of 12-50 carbon atoms in at least one arm. All molecular weights are as measured by Gel Permeation Chromatography with reference to linear narrow poly (methylmethacrylate) standards in the range of 550 to 600,000 g/mol.

When $R^1$ and/or $R^2$ is a macro-monomeric hydrocarbyl group, it may be provided via
- a) polymerization from a reactive group in an $R^1$ or $R^2$ precursor; or
- b) incorporation of a pre-formed macro-monomeric hydrocarbyl group in an $R^1$ or $R^2$ precursor.

The significance of the presence of $R^1$ and/or $R^2$ groups having 12-50 carbon atoms is to make the copolymers sufficiently oleophilic to confer solubility in a polar media such as base oil.

Preferably $R^1$ and $R^2$ are the same or different and contain 1 to 36, more preferably 1 to 20 carbon atoms, provided that some or all of the groups $R^1$ or $R^2$ have 12 to 75, preferably 12 to 50, for example 12 to 36 carbon atoms.

As examples of the number of carbon atoms in the $R^1$ and $R^2$ groups, there may be mentioned 1, 2, 8, 12, 17 and 24.

In one embodiment one of groups $R^1$ and $R^2$ comprise unsaturated hydrocarbyl groups having between 8 and 20 carbon atoms in which case the other group is saturated. In another embodiment, both of groups $R^1$ and $R^2$ comprise unsaturated hydrocarbyl groups having between 8 and 20 carbon atoms.

Preferably, at least 5% of the total number of either or both of the groups $R^1$ and $R^2$ in the polymer comprise unsaturated hydrocarbyl groups having between 8 and 20 carbon atoms. More preferably, at least 10%, or 20% or 30% or 40% or 50% of the total number of either or both of the groups $R^1$ and $R^2$ in the polymer comprise unsaturated hydrocarbyl groups having between 8 and 20 carbon atoms. Most preferably, at least 60% or 70% of the total number of either or both of the groups $R^1$ and $R^2$ in the polymer comprise unsaturated hydrocarbyl groups having between 8 and 20 carbon atoms.

Preferably, at least 5% of the total number of either or both of the groups $R^1$ and $R^2$ in the polymer comprise unsaturated hydrocarbyl groups having between 15 and 20 carbon atoms. More preferably, at least 10%, or 20% or 30% or 40% or 50% of the total number of either or both of the groups $R^1$ and $R^2$ in the polymer comprise unsaturated hydrocarbyl groups having between 15 and 20 carbon atoms. Most preferably, at least 60% or 70% of the total number of either or both of the groups $R^1$ and $R^2$ in the polymer comprise unsaturated hydrocarbyl groups having between 15 and 20 carbon atoms.

Preferably, at least 5% of the total number of either or both of the groups $R^1$ and $R^2$ in the polymer comprise unsaturated hydrocarbyl groups having 17 carbon atoms. More preferably, at least 10%, or 20% or 30% or 40% or 50% or 60% of the total number of either or both of the groups $R^1$ and $R^2$ in the polymer comprise unsaturated hydrocarbyl groups having 17 carbon atoms. Even more preferably, at least 70% of the total number of either or both of the groups $R^1$ and $R^2$ in the polymer comprise unsaturated hydrocarbyl groups having 17 carbon atoms.

In an embodiment, groups $R^1$ and $R^2$ do not contain any hetero-atoms, i.e. are hydrocarbon groups. Preferably groups $R^1$ and $R^2$ are hydrocarbon groups.

In preferred embodiments, at least 50% of the total number of either or both of the groups $R^1$ and $R^2$ in the polymer comprise singly, doubly or triply-unsaturated $C_{17}$ alkenyl groups or any mixture thereof. More preferably, at least 60% of the total number of either or both of the groups $R^1$ and $R^2$ in the polymer comprise singly, doubly or triply-unsaturated $C_{17}$ alkenyl groups or any mixture thereof. Even more preferably, at least 70% of the total number of either or both of the groups $R^1$ and $R^2$ in the polymer comprise singly, doubly or triply-unsaturated $C_{17}$ alkenyl groups or any mixture thereof.

In particularly preferred embodiments, either or both of groups $R^1$ and $R^2$ comprise a mixture of singly, doubly or triply-unsaturated $C_{17}$ alkenyl groups which mixture predominates in singly, and doubly-unsaturated $C_{17}$ alkenyl groups. Such mixtures may comprise small amounts of smaller and longer molecules.

Suitable sources for mixtures of groups for either or both of $R^1$ and $R^2$ include 2-oxazolines and 2-oxazines derived from natural fatty acids such as tall oil fatty acid (TOFA) and rape-seed oil fatty acid. Other suitable sources will be known to those skilled in the art.

In an embodiment, $R^1$ and/or $R^2$ may contain hetero atoms (such as N, O, S, P, B, Si, F, Cl, Br, I). As discussed hereinabove, the term 'hydrocarbyl' when applied to $R^1$ and $R^2$ permits the presence of a limited number of hetero atoms and so is not limited to groups which contain carbon and hydrogen only.

Lubricating Compositions

Lubricating compositions of the invention may be lubricants suitable for use as motor vehicle motor oils comprising a major amount of oil of lubricating viscosity and minor amounts of performance-enhancing additives, including the polymeric material. The lubricating composition may also be in the form of an additive concentrate for blending with oil of lubricating viscosity to make a final lubricant.

Preferably the lubricating compositions of the invention will contain 0.01 to 25 percent by mass, based on the mass of the composition of the oil-soluble copolymer, more preferably 0.01 to 10, for example up to 0.5, 1, 2, 3, 4 or 5 percent by mass, based on the mass of the composition. When in the form of an additive concentrate, typically the oil-soluble copolymer will be present in an oil of lubricating viscosity in an amount of 30 to 50 percent by mass, based on the mass of the composition.

The oil of lubricating viscosity (sometimes referred to as "base stock" or "base oil") is the primary liquid constituent of a lubricant, into which additives and possibly other oils are blended, for example to produce a final lubricant (or lubricant composition). A base oil, which is useful for making additive concentrates as well as for making lubricating oil compositions therefrom, may be selected from natural oils (vegetable, animal or mineral) and synthetic lubricating oils and mixtures thereof.

Definitions for the base stocks and base oils in this invention are the same as those found in the American Petroleum Institute (API) publication "Engine Oil Licensing and Certification System", Industry Services Department, Fourteenth Edition, December 1996, Addendum 1, December 1998, which categorizes base stocks as follows:
- a) Group I base stocks contain less than 90 percent saturates and/or greater than 0.03 percent sulphur and have a viscosity index greater than or equal to 80 and less than 120 using the test methods specified in Table E-1.
b) Group II base stocks contain greater than or equal to 90 percent saturates and less than or equal to 0.03 percent sulphur and have a viscosity index greater than or equal to 80 and less than 120 using the test methods specified in Table E-1.
c) Group III base stocks contain greater than or equal to 90 percent saturates and less than or equal to 0.03 percent sulphur and have a viscosity index greater than or equal to 120 using the test methods specified in Table E-1.
d) Group IV base stocks are polyalphaolefins (PAO).
e) Group V base stocks include all other base stocks not included in Group I, II, III, or IV.

Typically, the base stock has a viscosity preferably of 3-12, more preferably 4-10, most preferably 4.5-8, mm$^2$/s at 100° C.

TABLE E-1

Analytical Methods for Base Stock

| Property | Test Method |
| --- | --- |
| Saturates | ASTM D 2007 |
| Viscosity Index | ASTM D 2270 |
| Sulphur | ASTM D 2622 |
|  | ASTM D 4294 |
|  | ASTM D 4927 |
|  | ASTM D 3120 |

Preferably, the oil of lubricating viscosity comprises greater than or equal to 10, more preferably greater than or equal to 20, even more preferably greater than or equal to 25, even more preferably greater than or equal to 30, even more preferably greater than or equal to 40, even more preferably greater than or equal to 45, mass % of a Group II or Group III base stock, based on the total mass of the oil of lubricating viscosity. Even more preferably, the oil of lubricating viscosity comprises greater than 50, preferably greater than or equal to 60, more preferably greater than or equal to 70, even more preferably greater than or equal to 80, even more preferably greater than or equal to 90, mass % of a Group II or Group III base stock, based on the total mass of the oil of lubricating viscosity. Most preferably, the oil of lubricating viscosity consists essentially of a Group II and/or Group III base stock. In some embodiments the oil of lubricating viscosity consists solely of Group II and/or Group III base stock. In the latter case it is acknowledged that additives included in the lubricating oil composition may comprise a carrier oil which is not a Group II or Group III base stock.

Other oils of lubricating viscosity that may be included in the lubricating oil composition are detailed as follows:

Natural oils include animal and vegetable oils (e.g. castor and lard oil), liquid petroleum oils and hydro refined, solvent-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils such as polymerized and interpolymerized olefins (e.g. polybutylenes, polypropylenes, propylene-isobutylene copolymers, chlorinated polybutylenes, poly(1-hexenes), poly(1-octenes), poly(1-decenes)); alkylbenzenes (e.g. dodecylbenzenes, tetradecylbenzenes, dinonylbenzenes, di(2-ethylhexyl)benzenes); polyphenols (e.g. biphenyls, terphenyls, alkylated polyphenols); and alkylated diphenyl ethers and alkylated diphenyl sulfides and the derivatives, analogues and homologues thereof.

Another suitable class of synthetic lubricating oil comprises the esters of dicarboxylic acids (e.g. phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g. butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linolreic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols, and polyol ethers such as neopentyl glycol, trimethylolpropane, pentaerythritol, dipentaerythritol and tripentaerythritol.

Unrefined, refined and re-refined oils can be used in the compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be unrefined oil. Refined oils are similar to the unrefined oils except they have been further treated in one or more purification steps to improve one or more properties. Many such purification techniques, such as distillation, solvent extraction, acid or base extraction, filtration and percolation, are known to those skilled in the art. Re-refined oils are obtained by processes similar to those used to obtain refined oils applied to refined oils that have been already used in service. Such re-refined oils are also known as reclaimed or reprocessed oils and often are additionally processed by techniques for treating spent additive and oil breakdown products.

Other examples of base oil are gas-to-liquid ("GTL") base oils, i.e. the base oil may be an oil derived from Fischer-Tropsch synthesised hydrocarbons made from synthesis gas containing $H_2$ and CO using a Fischer-Tropsch catalyst. These hydrocarbons typically require further processing in order to be useful as a base oil. For example, they may, by methods known in the art, be hydroisomerized; hydrocracked and hydroisomerized; dewaxed; or hydroisomerized and dewaxed.

The oil of lubricating viscosity may also comprise a Group I, Group IV or Group V base stocks or base oil blends of the aforementioned base stocks.

The lubricating compositions of the present invention preferably comprise at least 60% by weight, for example 70% by weight or more of an oil of lubricating viscosity, based on the weight of the composition.

Co-Additives

The lubricating oil compositions of all aspects of the present invention may further comprise one or more phosphorus-containing compounds; oxidation inhibitors or anti-oxidants; dispersants; metal detergents; and other co-additives, provided they are different from the oil-soluble copolymer comprising units (a) and units (b). These will be discussed in more detail below.

Suitable phosphorus-containing compounds include dihydrocarbyl dithiophosphate metal salts, which are frequently used as antiwear and antioxidant agents. The metal is preferably zinc, but may be an alkali or alkaline earth metal, or aluminium, lead, tin, molybdenum, manganese, nickel or copper. The zinc salts are most commonly used in lubricating oil in amounts of 0.1 to 10, preferably 0.2 to 2 mass %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$, and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

The preferred zinc dihydrocarbyl dithiophosphates are oil-soluble salts of dihydrocarbyl dithiophosphoric acids and may be represented by the following formula:

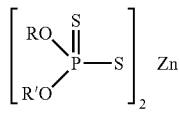

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butentyl. In order to obtain oil solubility, the total number of carbon atoms (i.e. R and R') in the dithiophosphoric acid will generally be 5 or greater. The zinc dihydrocarbyl dithiophosphate (ZDDP) can therefore comprise zinc dialkyl dithiophosphates. Lubricating oil compositions of the present invention suitably may have a phosphorus content of no greater than about 0.08 mass % (800 ppm). Preferably, in the practice of the present invention, ZDDP is used in an amount close or equal to the maximum amount allowed, preferably in an amount that provides a phosphorus content within 100 ppm of the maximum allowable amount of phosphorus. Thus, lubricating oil compositions useful in the practice of the present invention preferably contain ZDDP or other zinc-phosphorus compounds, in an amount introducing from 0.01 to 0.08 mass % of phosphorus, such as from 0.04 to 0.08 mass % of phosphorus, preferably, from 0.05 to 0.08 mass % of phosphorus, based on the total mass of the lubricating oil composition.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons or esters, phosphorous esters, metal thiocarbamates, oil soluble copper compounds as described in U.S. Pat. No. 4,867,890, and molybdenum-containing compounds.

Aromatic amines having at least two aromatic groups attached directly to the nitrogen constitute another class of compounds that is frequently used for antioxidancy. Typical oil-soluble aromatic amines having at least two aromatic groups attached directly to one amine nitrogen contain from 6 to 16 carbon atoms. The amines may contain more than two aromatic groups. Compounds having a total of at least three aromatic groups in which two aromatic groups are linked by a covalent bond or by an atom or group (e.g., an oxygen or sulfur atom, or a —CO—, —SO$_2$— or alkylene group) and two are directly attached to one amine nitrogen are also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups. The amount of any such oil soluble aromatic amines having at least two aromatic groups attached directly to one amine nitrogen should preferably not exceed 0.4 mass %.

A dispersant is an additive whose primary function is to hold solid and liquid contaminations in suspension, thereby passivating them and reducing engine deposits at the same time as reducing sludge depositions. For example, a dispersant maintains in suspension oil-insoluble substances that result from oxidation during use of the lubricant, thus preventing sludge flocculation and precipitation or deposition on metal parts of the engine.

Dispersants in this invention are preferably "ashless", as mentioned above, being non-metallic organic materials that form substantially no ash on combustion, in contrast to metal-containing and hence ash-forming materials. They comprise a long hydrocarbon chain with a polar head, the polarity being derived from inclusion of e.g. an O, P, or N atom. The hydrocarbon is an oleophilic group that confers oil-solubility, having, for example 40 to 500 carbon atoms. Thus, ashless dispersants may comprise an oil-soluble polymeric backbone.

A preferred class of olefin polymers is constituted by polybutenes, specifically polyisobutenes (PIB) or poly-n-butenes, such as may be prepared by polymerization of a $C_4$ refinery stream.

Dispersants include, for example, derivatives of long chain hydrocarbon-substituted carboxylic acids, examples being derivatives of high molecular weight hydrocarbyl-substituted succinic acid. A noteworthy group of dispersants is constituted by hydrocarbon-substituted succinimides, made, for example, by reacting the above acids (or derivatives) with a nitrogen-containing compound, advantageously a polyalkylene polyamine, such as a polyethylene polyamine. Particularly preferred are the reaction products of polyalkylene polyamines with alkenyl succinic anhydrides, such as described in U.S. Pat. Nos. 3,202,678; 3,154,560; 3,172,892; 3,024,195; 3,024,237, 3,219,666; and 3,216,936, that may be post-treated to improve their properties, such as borated (as described in U.S. Pat. Nos. 3,087,936 and 3,254,025), fluorinated or oxylated. For example, boration may be accomplished by treating an acyl nitrogen-containing dispersant with a boron compound selected from boron oxide, boron halides, boron acids and esters of boron acids.

Preferably, the dispersant, if present, is a succinimide-dispersant derived from a polyisobutene of number average molecular weight in the range of 1000 to 3000, preferably 1500 to 2500, and of moderate functionality. The succinimide is preferably derived from highly reactive polyisobutene.

Another example of dispersant type that may be used is a linked aromatic compound such as described in EP-A-2 090 642.

A detergent is an additive that reduces formation of piston deposits, for example high-temperature varnish and lacquer deposits in engines; it normally has acid-neutralising properties and is capable of keeping finely-divided solids in suspension. Most detergents are based on metal "soaps", that is metal salts of acidic organic compounds.

Detergents generally comprise a polar head with a long hydrophobic tail, the polar head comprising the metal salt of the acidic organic compound. The salts may contain a substantially stoichiometric amount of the metal when they are usually described as normal or neutral salts and would typically have a total base number or TBN at 100% active mass (as may be measured by ASTM D2896) of from 0 to 80. Large amounts of a metal base can be included by reaction of an excess of a metal compound, such as an oxide or hydroxide, with an acidic gas such as carbon dioxide.

The resulting overbased detergent comprises neutralised detergent as an outer layer of a metal base (e.g. carbonate) micelle. Such overbased detergents may have a TBN at 100% active mass of 150 or greater, and typically of from 200 to 500 or more.

Suitably, detergents that may be used include oil-soluble neutral and overbased sulfonates, phenates, sulfurised phenates, thiophosphonates, salicylates and naphthenates and other oil-soluble carboxylates of a metal, particularly alkali metal or alkaline earth metals, e.g. Na, K, Li, Ca and Mg. The most commonly-used metals are Ca and Mg, which may both be present in detergents used in lubricating compositions, and mixtures of Ca and/or Mg with Na. Detergents may be used in various combinations.

Additional additives may be incorporated into the compositions of the invention to enable particular performance requirements to be met. Examples of such additives which may be included in the lubricating oil compositions of the present invention are metal rust inhibitors, viscosity index improvers, corrosion inhibitors, oxidation inhibitors, other friction modifiers, anti-foaming agents, anti-wear agents and pour point depressants. Some are discussed in further detail below.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; and alkoxylated alkyl-substituted mono-amines, diamines and alkyl ether amines, for example, ethoxylated tallow amine and ethoxylated tallow ether amine.

Other known friction modifiers comprise oil-soluble oregano molybdenum compounds. Such oregano-molybdenum friction modifiers also provide antioxidant and antiwear credits to a lubricating oil composition. Examples of such oil-soluble oregano-molybdenum compounds include dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Additionally, the molybdenum compound may be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkali metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds.

Among the molybdenum compounds useful in the compositions of this invention are oregano-molybdenum compounds of the formula

 and

wherein R" is an oregano group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

Another group of oregano-molybdenum compounds useful in the lubricating compositions of this invention are trinuclear molybdenum compounds, especially those of the formula $Mo_3S_kL_nQ_z$ and mixtures thereof wherein the L are independently selected ligands having oregano groups with a sufficient number of carbon atoms to render the compound soluble or dispersible in the oil, n is from 1 to 4, k varies from 4 to 7, Q is selected from the group of neutral electron donating compounds such as water, amines, alcohols, phosphines, and ethers, and z ranges from 0 to 5 and includes non-stoichiometric values. At least 21 carbon atoms should be present among all the ligand oregano groups, such as at least 25, at least 30, or at least 35, carbon atoms.

Lubricating oil compositions useful in all aspects of the present invention preferably contain at least 10 ppm, at least 30 ppm, at least 40 ppm and more preferably at least 50 ppm molybdenum. Suitably, lubricating oil compositions useful in all aspects of the present invention contain no more than 1000 ppm, no more than 750 ppm or no more than 500 ppm of molybdenum. Lubricating oil compositions useful in all aspects of the present invention preferably contain from 10 to 1000, such as 30 to 750 or 40 to 500, ppm of molybdenum (measured as atoms of molybdenum).

The viscosity index of the base stock is increased, or improved, by incorporating therein certain polymeric materials that function as viscosity modifiers (VM) or to viscosity index improvers (VII). Generally, polymeric materials useful as viscosity modifiers are those having number average molecular weights (Mn) of from 5,000 to 250,000, preferably from 15,000 to 200,000, more preferably from 20,000 to 150,000. These viscosity modifiers can be grafted with grafting materials such as, for example, maleic anhydride, and the grafted material can be reacted with, for example, amines, amides, nitrogen-containing heterocyclic compounds or alcohol, to form multifunctional viscosity modifiers (dispersant-viscosity modifiers).

Polymers prepared with diolefins will contain ethylenic unsaturation, and such polymers are preferably hydrogenated. When the polymer is hydrogenated, the hydrogenation may be accomplished using any of the techniques known in the prior art. For example, the hydrogenation may be accomplished such that both ethylenic and aromatic unsaturation is converted (saturated) using methods such as those taught, for example, in U.S. Pat. Nos. 3,113,986 and 3,700,633 or the hydrogenation may be accomplished selectively such that a significant portion of the ethylenic unsaturation is converted while little or no aromatic unsaturation is converted as taught, for example, in U.S. Pat. Nos. 3,634,595; 3,670,054; 3,700,633 and Re 27,145. Any of these methods can also be used to hydrogenate polymers containing only ethylenic unsaturation and which are free of aromatic unsaturation.

Pour point depressants (PPD), otherwise known as lube oil flow improvers (LOFIs) lower the lowest temperature at which the lube flows. Compared to VM, LOFIs generally have a lower number average molecular weight. Like VM, LOFIs can be grafted with grafting materials such as, for example, maleic anhydride, and the grafted material can be reacted with, for example, amines, amides, nitrogen-containing heterocyclic compounds or alcohol, to form multi-functional additives.

In the present invention it may be necessary to include an additive which maintains the stability of the viscosity of the blend. Thus, although polar group-containing additives achieve a suitably low viscosity in the pre-blending stage, it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as hereinbefore disclosed.

When lubricating compositions contain one or more of the above-mentioned additives, each additive is typically blended into the base oil in an amount that enables the additive to provide its desired function. Representative effective amounts of such additives, when used in crankcase lubricants, are listed below. All the values listed (with the exception of detergent values since the detergents are used in the form of colloidal dispersants in an oil) are stated as mass percent active ingredient (A.I.).

| ADDITIVE | MASS % (Broad) | MASS % (Preferred) |
|---|---|---|
| Dispersant | 0.1-20 | 1-8 |
| Metal Detergents | 0.1-15 | 0.2-9 |
| Corrosion Inhibitor | 0-5 | 0-1.5 |
| Metal dihydrocarbyl dithiophosphate | 0.1-6 | 0.1-4 |
| Antioxidant | 0-5 | 0.01-2.5 |
| Pour Point Depressant | 0.01-5 | 0.01-1.5 |
| Antifoaming Agent | 0-5 | 0.001-0.15 |
| Supplemental Antiwear Agents | 0-1.0 | 0-0.5 |
| Friction Modifier | 0-5 | 0-1.5 |
| Viscosity Modifier | 0.01-10 | 0.25-3 |
| Base stock | Balance | Balance |

Preferably, the Noack volatility of the fully formulated lubricating oil composition (oil of lubricating viscosity plus all additives) is no greater than 18, such as no greater than 14, preferably no greater than 10, mass %. Lubricating oil compositions useful in the practice of the present invention may have an overall sulfated ash content of from 0.5 to 2.0, such as from 0.7 to 1.4, preferably from 0.6 to 1.2, mass %.

It may be desirable, although not essential, to prepare one or more additive concentrates comprising additives (concentrates sometimes being referred to as additive packages) whereby several additives can be added simultaneously to the oil to form the lubricating oil composition.

EXAMPLES

The invention will now be particularly described in the following non-limiting examples.

Synthesis of Copolymers

Stearic acid derived 2-oxazine (20 eq.), stearic acid derived 2-oxazoline (20 eq.) and propargyl tosylate (1.00 eq.) were stirred at 100° C. for 30 min, 120° C. for 30 min and 140° C. until NMR showed quantitative conversion of the starting materials. Yellow or brownish sticky material were obtained and used without any further purification. The copolymer so obtained (P1) had a number average molecular weight (Mn) of 11,000 and a dispersity (Đ) of 1.34. Mn was determined by Gel permeation chromatography (GPC) on an Agilent 1260 infinity system operating in DMF with 5 mM $NH_4BF_4$ and equipped with refractive index detector and variable wavelength detector, 2 PLgel 5 µm mixed-C columns (300×7.5 mm), a PLgel 5 mm guard column (50×7.5 mm) and an autosampler. The instrument was calibrated with linear narrow poly(methyl methacrylate) standards in range of 550 to 600,000 g/mol. All samples were filtered with a 0.2 µm Nylon 66 filter before analysis.

Rapeseed fatty acid derived 2-oxazoline (20 eq.), the fatty acid having greater than 40% of molecules having unsaturated $C_{16}$ to $C_{18}$ groups (corresponding to greater than 40% of groups $R^1$ in the resulting copolymer being unsaturated and having 15 to 17 carbon atoms); stearic acid derived 2-oxazine (20 eq.) and propargyl tosylate (1.00 eq.) were stirred at 100° C. for 30 min, 120° C. for 30 min and 140° C. until NMR showed quantitative conversion of the starting material. Yellow or brownish sticky material were obtained and used without any further purification. The copolymer so obtained (P2) had a number average molecular weight (Mn) of 10,100 and a dispersity (Đ) of 1.71. Mn was determined by Gel permeation chromatography (GPC) in the same way as for P1.

Tests

Each of the above polymers was tested when dispersed in an API Group I base oil (SN15OFAW) at 0.91 wt % concentration in one or more of the following tests.

Friction Coefficient:

MTM (mini traction machine), supplied by PCS Instruments

The test profile consisted of nine steps, alternating traction and Stribeck curves, over a range of temperatures:

| Step No. | Step type | Temperature (° C.) |
|---|---|---|
| 1 | Traction | 40 |
| 2 | Traction | 60 |
| 3 | Stribeck | 60 |
| 4 | Traction | 80 |
| 5 | Stribeck | 80 |
| 6 | Traction | 100 |
| 7 | Stribeck | 100 |
| 8 | Traction | 135 |
| 9 | Stribeck | 135 |

The test parameters were as follows:

| Parameter description (units) | Value |
|---|---|
| Load (N) | 30 |
| Stribeck step speed range (mm/s) | 2000-20 |
| Stribeck step Slide-toRoll ratio (%) | 50 |
| Traction step SRR range (%) | 0-60 |
| Traction step rolling speed (mm/s) | 1000 |
| Test duration (min) | 52 |
| Disc track radius (mm) | 21.05 |
| Specimen steel grade | AISI 52100 |
| Ball diameter (mm) | 19 |
| Disc diameter (mm) | 46 |

Two or three independent repeats were carried out in a randomised trial and the results were averaged.

Viscometric Determination

Polymer concentration for viscometric determinations×1 wt % in the same API Group I base oil (SN15OFAW) as used above.

HTHS (high temperature high shear) viscosity at 150° C.-CEC-L-36-90

Results

| Example | HTHS | Base oil | Average Friction Coefficient[a] |
|---|---|---|---|
| P1 | Not measured | Gp III (Yubase 4) | 0.059 |
| P2 | 1.88 | Gp I (SN150FAW) | 0.036 |
| Comp[b] | 2.62 | Gp III (Yubase 4) | 0.043 |
| Base Oil 1 alone | 1.80 | Gp I (SN150FAW) | 0.081 |
| Base Oil 2 alone | 1.52 | Gp III (Yubase 4) | 0.077 |

[a]Average Friction Coefficient is calculated in the region of the Stribeck Curve from a mean rolling speed of 20.1 mms$^{-1}$
[b]Comp. is a comparative test using 1.00 wt % of a commercially-available olefin co-polymer dispersant viscosity modifier: HiTec 5777 in Group III (Yubase 4) base stock.

The results show that the examples of the invention (P1 and P2) exhibited friction benefits compared with the base oil tests when the copolymers were absent. Friction performance was similar to the commercial viscosity modifier additive at the given polymer treat rate but significantly, the HTHS viscosity of P1 was significantly better.

What is claimed is:

1. A lubricating composition comprising a major amount of an oil of lubricating viscosity and 0.01 to 25 percent by mass, based on the mass of the composition of an oil-soluble copolymer comprising units (a) and units (b):

$$-N(COR^1)CH_2CH_2- \quad (a)$$

$$-N(COR^2)CH_2CH_2CH_2- \quad (b)$$

wherein the polymer carries an inorganic or organic nucleophilic polymerisation terminating group (t), and an initiator group (i) connected to the N atom of a repeat unit (a) or (b), the initiator group (i) being effective to initiate the polymerisation of linear, branched or cyclic hydrocarbyl moieties; and wherein each $R^1$ and each $R^2$ are the same or different and independently comprise a single or a mixture of linear, branched or cyclic hydrocarbyl groups having 1-50 carbon atoms, or of at least one macro-monomeric hydrocarbyl group with more than 50 carbon atoms;

with the proviso that when $R^1$ and $R^2$ comprise linear, branched or cyclic hydrocarbyl groups having 1-50 carbon atoms, the $R^1$ and/or $R^2$ of at least one of said units (a) and/or (b) is a linear, branched or cyclic hydrocarbyl groups having 12-50 carbon atoms.

2. A lubricating composition according to claim 1 wherein units (a) comprise from 1 to 99 mol % of the copolymer and units (b) comprise from 1 to 99 mol % of the copolymer.

3. A lubricating composition according to claim 2 wherein the copolymer comprises 50 mol % of units (a) and 50 mol % of units (b).

4. A lubricating composition according to claim 1 wherein the copolymer is a statistical copolymer or a random copolymer.

5. A lubricating composition according to claim 1 wherein the copolymer is an alternating copolymer, a periodic copolymer or a block copolymer.

6. A lubricating composition according to claim 1 wherein the copolymer has a linear architecture.

7. A lubricating composition according to claim 1 wherein the copolymer has a branched or star architecture.

8. A lubricating composition according to claim 1 wherein each $R^1$ and each $R^2$ is the same or different and contain 1 to 36 carbon atoms, provided that at least one of groups $R^1$ and/or $R^2$ have 12 to 36 carbon atoms.

9. A lubricating composition according to claim 1 wherein the copolymer has a number average molecular weight (Mn) of 2,000-500.000 g/mol, as measured by Gel Permeation Chromatography with reference to linear narrow poly(methylmethacrylate) standards in the range of 550 to 600,000 g/mol.

10. A lubricating composition according to claim 1 wherein one of groups $R^1$ and $R^2$ comprise unsaturated hydrocarbyl groups having between 8 and 20 carbon atoms, and the other of groups $R^1$ and $R^2$ is saturated.

11. A lubricating composition according to claim 1 wherein both of groups $R^1$ and $R^2$ comprise unsaturated hydrocarbyl groups having between 16 and 20 carbon atoms.

12. A lubricating composition according to claim 1 wherein at least 5% of the total number of either or both of the groups $R^1$ and $R^2$ in the polymer comprise unsaturated hydrocarbyl groups having between 8 and 20 carbon atoms.

13. A lubricating composition according to claim 1 wherein at least 5% of the total number of either or both of the groups $R^1$ and $R^2$ in the polymer comprise unsaturated hydrocarbyl groups having 17 carbon atoms.

14. A lubricating composition according to claim 1 wherein at least 50% of the total number of either or both of the groups $R^1$ and $R^2$ in the polymer comprise singly, doubly or triply-unsaturated $C_{17}$ alkenyl groups or any mixture thereof.

15. A lubricating composition according to claim 1 wherein either or both of groups $R^1$ and $R^2$ are obtained from natural fatty acids.

16. A lubricating composition according to claim 1 comprising one or more co-additives, different from the oil-soluble copolymer, selected from one or more phosphorus-containing compounds; oxidation inhibitors or antioxidants; dispersants; metal-containing detergents; anti-wear agents; friction modifiers; and viscosity modifiers.

17. A lubricating composition according claim 1 comprising at least 60% by mass, of an oil of lubricating viscosity.

18. A method of lubricating the crankcase of an internal combustion engine comprising operating the engine and lubricating the crankcase with a lubricating composition of claim 1.

* * * * *